United States Patent [19]

Garbagnati

[11] Patent Number: 5,261,525
[45] Date of Patent: Nov. 16, 1993

[54] ENDLESS ROLLER CONVEYOR

[75] Inventor: Carlo Garbagnati, Castello Brianza, Italy

[73] Assignee: Regina Sud S.p.A., Latina, Italy

[21] Appl. No.: 944,108

[22] Filed: Sep. 11, 1992

[30] Foreign Application Priority Data

Sep. 19, 1991 [IT] Italy .................... 000812[U]

[51] Int. Cl.⁵ .................................... B65G 17/24
[52] U.S. Cl. .......................... 198/779; 198/853
[58] Field of Search ............ 198/850, 851, 853, 779

[56] References Cited

U.S. PATENT DOCUMENTS

| | | | |
|---|---|---|---|
| 3,910,404 | 10/1975 | Henrekson | 198/779 X |
| 4,271,960 | 6/1981 | Chalich | 198/779 |
| 4,821,869 | 4/1989 | Hodlewsky | 198/779 |
| 4,880,107 | 11/1989 | Deal | 198/779 |
| 4,909,380 | 3/1990 | Hodlewsky | 198/779 |
| 5,096,050 | 3/1992 | Hodlewsky | 198/779 |

FOREIGN PATENT DOCUMENTS 2366190 4/1978 France .

*Primary Examiner*—D. Glenn Dayoan
*Attorney, Agent, or Firm*—Jacobson, Price, Holman & Stern

[57] ABSTRACT

An endless conveyor comprises a sequence of link elements (10) connected to each other in an articulated manner, each of them supporting a plurality of idler rollers (14) disposed on parallel pivot pins (15) for defining a transporting surface at the upper part thereof. Each link element (10) is provided with faced side shoulders (18) having housings (19) designed to receive the pivot pin (15) ends. Shoulders (18) are engaged to the link element (10) by snap coupling means (24).

7 Claims, 2 Drawing Sheets

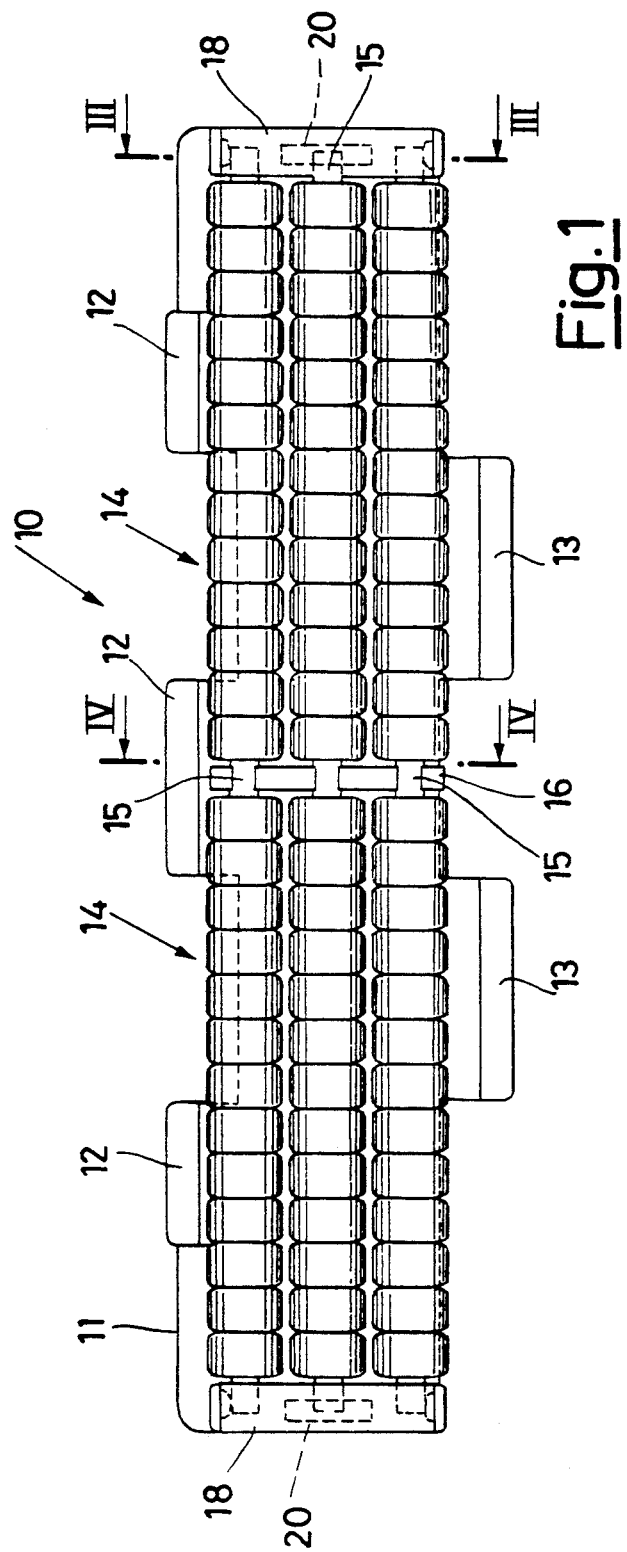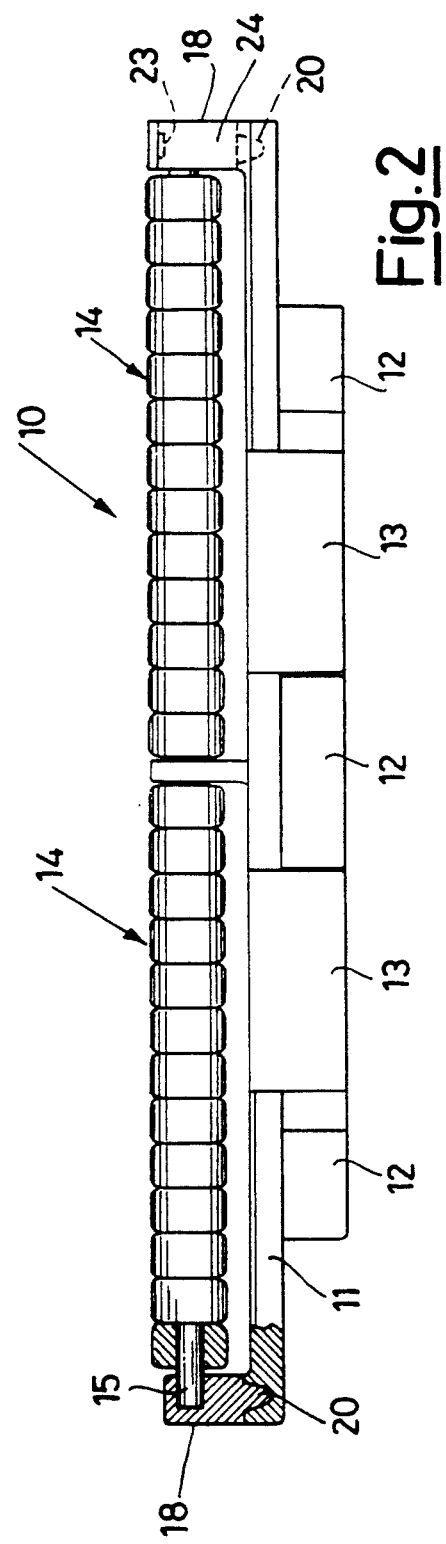

ENDLESS ROLLER CONVEYOR

BACKGROUND OF THE INVENTION

In the field of endless transporting installations, conveyors are known in which the transporting surface consists of a sequence of links pivotally mounted to each other and carrying at the upper part thereof rows of idler rollers constituting a resting surface for items carried thereon.

One of the problems arising in the installations of the known art is the assembling of the plurality of rollers to the links. In fact known assemblings involve either the impossibility of dismantling the rollers from the links or the necessity of tools, and a rather long time for assembling and disassembling. Since rollers are subjected to wear and therefore need to be periodically replaced it is apparent that difficulties and important costs arise when a complete link is to be changed or it is necessary to keep the installation at a standstill over a relatively long time.

The general object of the present invention is to obviate the previously mentioned drawbacks, by providing a transporting installation of the above type in which rollers can be easily and readily assembled to and disassembled from the links without particular tools being required.

SUMMARY OF THE INVENTION

In view of the above object, in accordance with the invention an endless conveyor has been devised which comprises a sequence of link elements connected to one another in an articulated manner, each of them supporting a plurality of idler rollers disposed on parallel pivot pins in order to identify a transporting surface at the upper part thereof, characterized in that each link element comprises faced side shoulders provided with housings for the pivot pin ends, said shoulders being fitted to the link element by snap coupling means.

BRIEF DESCRIPTION OF THE DRAWINGS

For a better understanding of the innovative principles and advantages of the present invention as compared to the known art, a possible embodiment of the invention will be given hereinafter by way of non-limiting example, with reference to the accompanying drawings, in which:

FIG. 1 is a plan view of a link element in an endless conveyor in accordance with the invention;

FIG. 2 is a front side view of the element shown in FIG. 1;

DESCRIPTION OF THE PREFERRED EMBODIMENT

Figure 3:
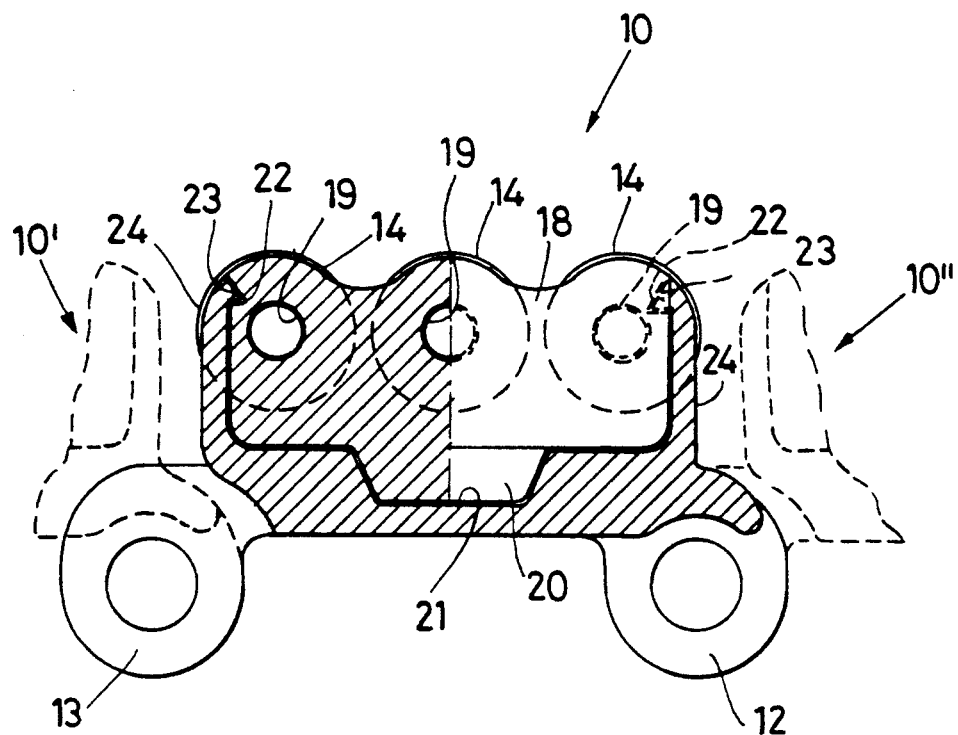
FIG. 3 is a sectional view taken along line III—III in FIG. 1.

Referring to the drawings, in FIGS. 1 and 2 a conveyor link element 10 made in accordance with the invention is shown. This element 10 is comprised of a link 11 having axially pierced joint wings 12 and 13 located on the opposite sides so that, as is known, it can be articulated to other similar elements in a continuous sequence thereby forming an endless transporting surface. In the following description only one of said link elements forming the sequence will be shown as the others are similar and pivotally mounted as diagrammatically shown in FIG. 3 where element 10 is shown pivotally connected to elements 10' and 10" of the sequence. Obviously the conveyor will be comprised of other elements such as guides, motors, pulleys, etc. which are not described as known in the art and therefore easily conceivable by a person of skill in the particular field. The link 11 supports a plurality of idler rollers 14 fitted on parallel pivot pins 15. The pivot pins are held up in an intermediate position at the ends by a support 16 comprising, as clearly shown in FIG. 4, housing 17 open at the top for enabling the pivot pins to be fitted thereinto from above.

Advantageously, the upper opening of the supporting housings has a smaller diameter than the pivot pins which enables them to be forcedly fitted thereinto.

Also disposed at either end of the link, as shown in FIG. 2, are supporting shoulders 18 provided with blind holes 19 for receiving the pivot pin ends.

Figure 4:
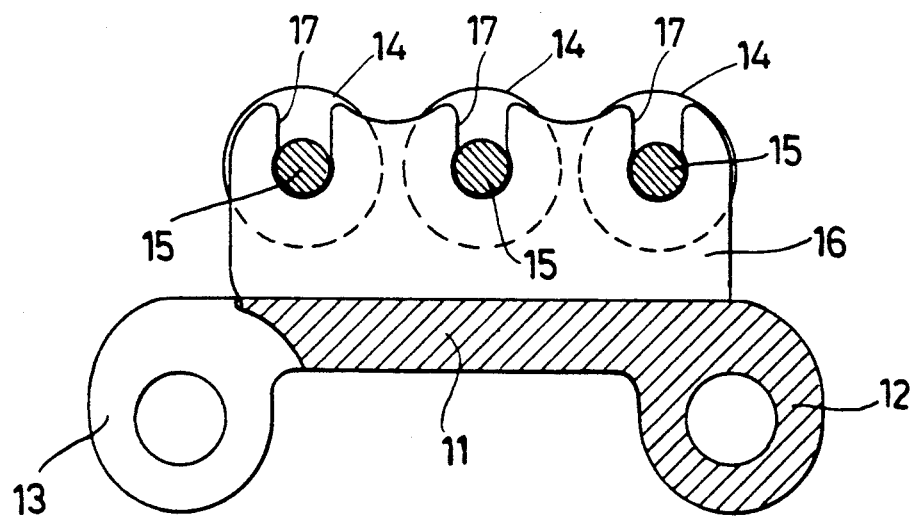
FIG. 4 is a sectional view taken along line IV—IV in FIG. 1.

As viewed from FIG. 3, each shoulder 18 comprises side coupling seats 22 designed to receive the teeth 23 of two spring arms 24 projecting from the link 11 in faced relationship. In addition, each shoulder 18 has a lower guide tooth 20 to be inserted in a complementary seat in the link 11.

In this way, for mounting the rollers to the link it is sufficient to fit them on the respective pivot pins, the ends of which are inserted into the blind holes of shoulders 18. Shoulders 18 are then put in place by introducing the lower tooth of each of them into its complementary seat as far as the arms 24 are nested in the side seats 22 of the shoulders. Simultaneously the median portions of the pivot pins engage into the housings 17 of the central support 16.

When rollers need to be dismantled, it suffices to spread the arms 24 apart in order to disengage the shoulders 18 therefrom and move them away enabling their separation from the pivot pins 15.

At this point it is clear that the intended purposes have been achieved. In a conveyor in accordance with the invention both assembling and disassembling of the rollers is very quick and does not require any particular tooling. In addition, on account of their simplicity, said link elements as described have a very reduced cost, while being at the same time very strong and safe so that accidental breakages and disassembling in operation are avoided.

As shown in FIGS. 1 and 2, advantageously the rollers as made have inclined side walls, for example cambered walls, so that adjacent rollers exhibit faced side walls diverging from each other so that they are more spaced apart towards the periphery of the rollers. Upon rotation of the rollers therefore a dirt-or foreign-matter ejecting action is achieved, which foreign matter could otherwise get wedged between the rollers.

Obviously the above description of one embodiment applying the innovative principles of the invention is given by way of example only and must not be considered as a limitation of the scope thereof as hereinafter claimed. For example, the number of rollers on each pivot pin and the number of pivot pins on each link can be different from the one shown. In addition, should the reduced length of the pins enable it, the central support 16 could be eliminated. On the contrary, in case of particularly long pivot pins, several intermediate support elements similar to support 16 could be provided.

Finally, also the form of the articulated joints between the links can be different from the one shown, the use of different articulation systems known in the art being possible.

I claim:

1. An endless conveyor comprising a sequence of link elements connected to one another in an articulated manner, each link element supporting a plurality of parallel pivot pins upon which are rotatably mounted idle rollers, an upper peripheral surface of said rollers together defining a transporting surface, each said link element defining a flat base portion located in a plane substantially parallel to said transporting surface, said base portion extending transversally to the direction of the conveyor movement having two lateral ends with snap coupling means and a shoulder snap coupled to each end and supporting pivot pin ends therein.

2. The conveyor according to claim 1, wherein said snap coupling means comprises on the link element and for each shoulder, a pair of faced arms having side teeth adapted to be snap fitted in corresponding seats provided in the shoulder.

3. The conveyor according to claim 1, wherein each link has a seat therein at an end thereof, and each shoulder is comprised of a lower guide tooth insertable complementarly in a seat of the link element in a direction normal to the pivot pin extension.

4. The conveyor according to claim 1, wherein said link element has at least one support at an intermediate position to said ends, said support having supporting seats for intermediate portions of said pivot pins.

5. The conveyor according to claim 4, wherein said intermediate supporting seats have openings at the top for introducing the pivot pins thereinto.

6. The conveyor according to claim 5, wherein each upper opening in the supporting seats has a smaller diameter than the pivot pins so that the pivot pins can be force fitted therein.

7. The conveyor according to claim 1, wherein adjacent rollers have facing peripheral side walls diverging towards the periphery of the rollers.

* * * * *